(12) United States Patent
Tiesler et al.

(10) Patent No.: US 7,458,627 B2
(45) Date of Patent: Dec. 2, 2008

(54) VISOR ASSEMBLY INCORPORATING AN ELECTRONIC CONTROL MODULE

(75) Inventors: John M. Tiesler, Dearborn, MI (US); John E. McConnell, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/682,016

(22) Filed: Mar. 5, 2007

(65) Prior Publication Data

US 2008/0217950 A1    Sep. 11, 2008

(51) Int. Cl.
B60J 3/00    (2006.01)
(52) U.S. Cl. ..................................... 296/97.5
(58) Field of Classification Search ............... 296/97.1, 296/97.5; 307/10.1; 340/825.22, 825.69, 340/825.72
See application file for complete search history.

(56) References Cited

U.S. PATENT DOCUMENTS

| | | | |
|---|---|---|---|
| 3,926,470 A * | 12/1975 | Marcus ...................... 296/97.5 |
| 4,247,850 A | 1/1981 | Marcus | |
| 5,205,639 A | 4/1993 | White et al. | |
| 5,510,791 A | 4/1996 | Viertel et al. | |
| 5,596,316 A * | 1/1997 | Honeck ...................... 343/713 |
| 5,699,055 A * | 12/1997 | Dykema et al. ......... 340/825.22 |
| 6,072,404 A | 6/2000 | Nolan et al. | |
| 6,091,343 A * | 7/2000 | Dykema et al. ......... 340/825.69 |
| 6,637,799 B1 * | 10/2003 | Tiesler ....................... 296/97.1 |
| 6,692,059 B1 * | 2/2004 | Mills ......................... 296/97.1 |
| 6,703,941 B1 * | 3/2004 | Blaker .................... 340/825.69 |
| 6,840,561 B2 | 1/2005 | Mills et al. | |
| 6,978,126 B1 * | 12/2005 | Blaker et al. ................. 455/352 |
| 7,025,399 B1 * | 4/2006 | Crotty, III .................. 296/97.1 |
| 2003/0151306 A1 * | 8/2003 | Weinberger ................ 307/10.1 |

* cited by examiner

*Primary Examiner*—H Gutman
(74) *Attorney, Agent, or Firm*—Brooks Kushman P.C.

(57) ABSTRACT

A visor assembly configured for use in a passenger compartment of a vehicle includes a first wall defining an inner surface and an outer surface including a channel formed therein and a bezel provided on the inner surface of the first wall cooperating with the channel. A second wall cooperates with the first wall to form a visor housing and a cavity defined therein. One or more openings are formed through the second wall. An electronic control module is disposed in the visor housing and includes a printed circuit board including one or more switches positioned in operative communication with one or more buttons extending at least partially through the second wall in the visor housing. The module includes a transmitter for transmitting a wireless control signal to control one or more remote devices when the one or more buttons are actuated by a user.

20 Claims, 3 Drawing Sheets

VISOR ASSEMBLY INCORPORATING AN ELECTRONIC CONTROL MODULE

BACKGROUND OF THE INVENTION

1. Field of the Invention

The present invention relates to a visor assembly for a vehicle incorporating an electronic control module that can be used to actuate a remote device.

2. Background Art

Visor assemblies, sometimes referred to as sun visors, are provided in vehicles to shield an occupant's eyes from sunlight or glare from an alternative light source. Visors may be pivotally mounted to an overhead roof structure or headliner of a vehicle to shield the occupant's vision from light entering through the window or windshield of the vehicle.

Vehicle manufacturers have place a priority on incorporating various convenience devices in the passenger compartment of the vehicle, including devices such as vanity lights, entertainment systems and garage door openers. Garage door operating systems are well known in the art. Such systems typically include at least one wireless transmitter and a garage door actuator. The actuator generally comprises an electric motor for driving a screw gear or chain to open or close a garage door. A receiver and controller are also typically provided for receiving signals from the wireless transmitter, and controlling the actuator. In operation, in order to open or close the garage door, a user activates the transmitter.

There are various situations in which it would be desirable to send a wireless signal to a receiver that is located remotely from a sending unit. For example, if the sending unit were located in a vehicle, there is technology presently available by which the sending unit can activate or de-activate an alarm system within a building or open and close a garage door. Some electronic garage door openers, for example, can be located in a vehicle's overhead console. Ideally, in-vehicle transmitter arrangements are such that the transmitter can be accessible immediately. Preferably, such transmitters can be operated without removal from the vehicle. Some approaches call for attaching the transmitter in the ceiling area of the vehicle, while protecting the transmitter (and a vehicle occupant) from unwanted dislodging from the overhead location. Traditional mounting arrangements for garage door openers in a vehicle may present operation problems for the transmitters. For example, buttons associated with the transmitter may tend to stick if there is improper alignment.

SUMMARY OF THE INVENTION

A visor assembly configured for use in a passenger compartment of a vehicle includes a first wall defining an inner surface and an outer surface including a channel formed therein and a bezel provided on the inner surface of the first wall cooperating with the channel. A second wall cooperates with the first wall to form a visor housing and a cavity defined therein. One or more openings are formed through the second wall.

An electronic control module is disposed in the visor housing and includes a printed circuit board including one or more switches positioned in operative communication with one or more buttons extending at least partially through the second wall in the visor housing. The module includes a transmitter for transmitting a wireless control signal to control one or more remote devices when the one or more buttons are actuated by a user.

DETAILED DESCRIPTION

Figure 1:
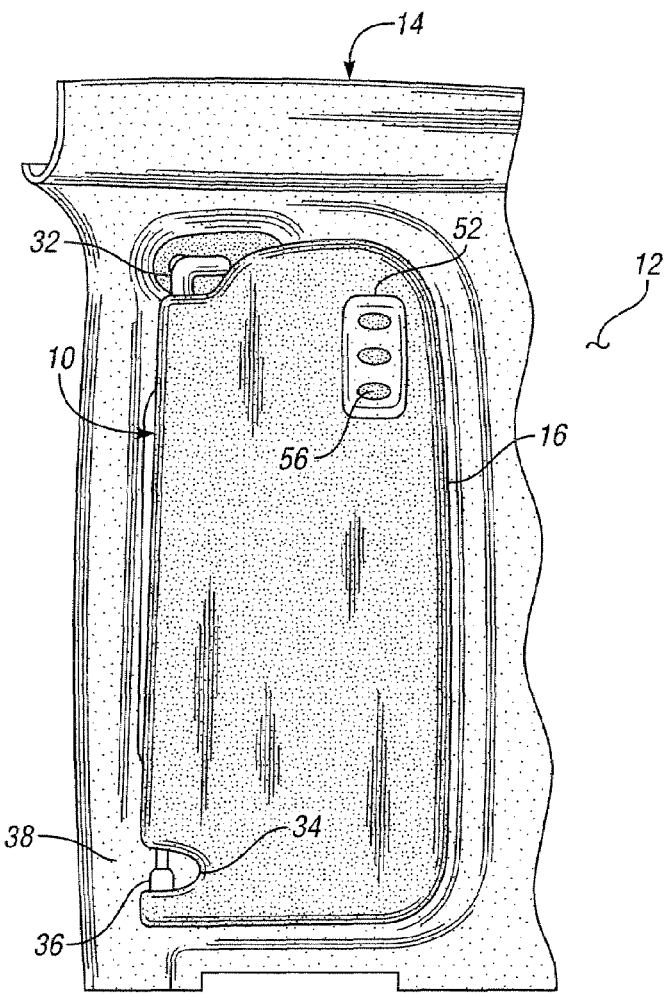
FIG. 1 is a bottom plan view of a visor assembly incorporating an electronic control module positioned adjacent a headliner in a passenger compartment of a vehicle.

A detailed description of the invention is disclosed herein. However, it is to be understood that the detailed description merely provides an exemplary view of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In the following figures the same reference numerals will be used to refer to the same components. While the invention is described primarily with respect to a visor assembly incorporating an electronic control module for use in a vehicle, the electronic control module may be adapted and applied in various locations within a vehicle, such as a trim component or may be applied in other non-vehicle applications. The system may be applied in various locations within a vehicle, such as in a trim component, dashboard, in an overhead console, in a center console, in a pillar, in a door panel, or the like.

In the following description, various operating parameters and components are described for one constructed embodiment. These specific parameters and components are included as examples and are not meant to be limiting.

Referring now to the Figures, FIG. 1 illustrates a visor assembly 10 for use in a passenger compartment 12 of a vehicle is shown. The visor assembly 10 may be configured to be adjustably positioned between at least one use position and a stored position illustrated in FIG. 1 disposed proximate to a headliner 14. It is understood that the visor assembly may be positioned adjacent to a variety of areas of the passenger compartment, such as adjacent a window or windshield or mounted to one or more components of the passenger compartment, such as the headliner by visor mounting arm 32 as shown in FIG. 1 or vehicle seat.

Visor assembly 10 includes at least one electronic control module 60 for controlling the operation at least one device. For example, the module 60 may be adapted to remotely control at least one device, such as a garage door opener or a security system. Of course, it is contemplated that the electronic control module may be configured such that the one or more devices are not remotely controlled. For instance, the module 60 be associated with a vehicle electrical system and may be electrically connected to one or more vehicular components.

Figure 2:
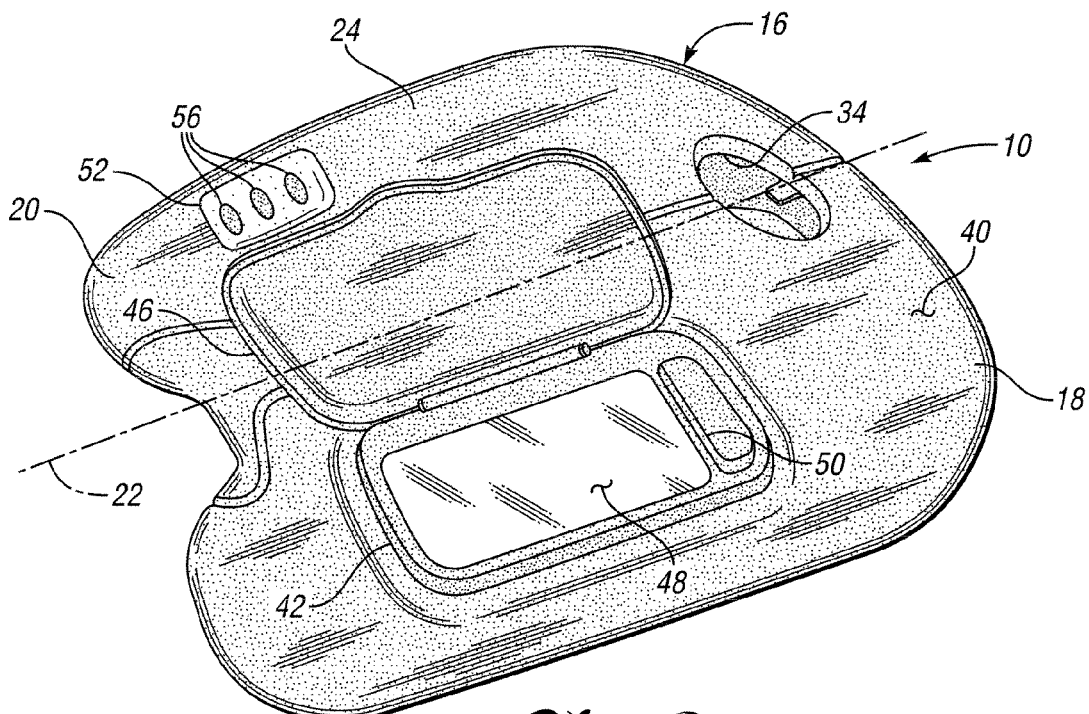
FIG. 2 is a perspective view of the outer or appearance surfaces of the visor assembly for use in a passenger compartment of a vehicle incorporating an electronic control module and vanity mirror or bezel.
Figure 3:
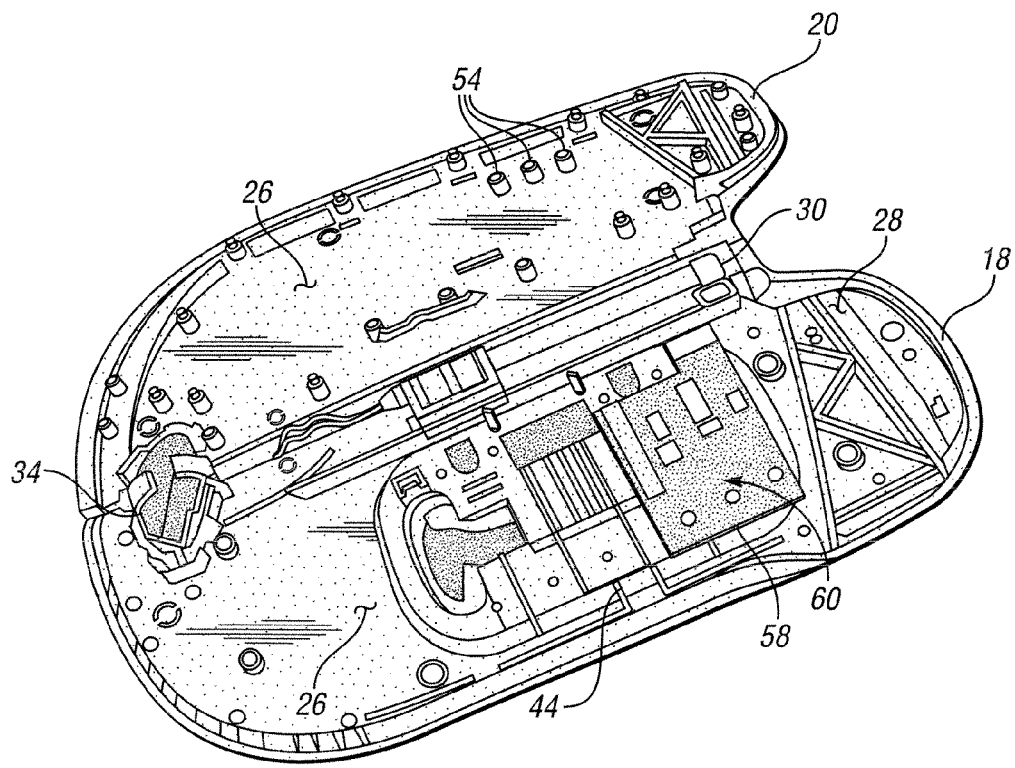
FIG. 3 is a perspective view of the inner surfaces or substrates of the visor assembly.

Referring now to FIGS. 2 and 3, visor assembly 10 includes a housing 16 having a pair of spaced apart walls 18, 20 that may be joined about a common central axis 22. The spaced apart first and second walls 18, 20 generally define an outer surface or periphery 24 of the visor housing 16 and an inner surface or periphery 26.

The inner surface 26 of each of the spaced apart first and second walls 18, 20 may define a cavity 28 when the spaced apart walls 18, 20 are placed adjacent each other. The pair of spaced apart first and second walls 18, 20 may be constructed from two opposing structural pieces or as a one-piece plastic clamshell housing about the common central axis 20. Alternatively, the visor assembly housing may be formed as a one or two piece structure from laminated paper board or other flat sheet product.

The pair of spaced apart first and second walls 18, 20 may be assembled together by folding the inner surfaces of each wall towards one another about the central axis 22 to create visor housing 16. Alternatively, the pair of spaced apart first and second walls 18, 20 may be formed as independent structures that may be connected to one another by fasteners or secured together by a bonding process, such as adhesive bonding or vibration welding, to form the visor housing 16. Similar features of the visor assembly are shown FIGS. 5 and 6, which illustrate an alternative configuration of the visor assembly.

Visor housing 16 may be formed in a variety of configurations. For example, a pair of spaced apart walls may be formed as a single clamshell housing having a common axis which the pair of spaced apart walls are folded about to secure the walls together. Alternatively, the pair of spaced apart walls are formed as independent structures joined to form the visor housing. It is also contemplated that the visor assembly may include an aperture defined in an edge or side cooperating with the cavity in the visor housing to receive an extender blade positionable between a retracted position received within the cavity of the visor housing and a extended position extending away from the outer surface of the visor housing to reduce the amount of light or glare entering into the interior of the vehicle.

A receiving portion 30 may be provided on inner surface 26 of one of the spaced apart first and second walls 18, 20 to receive a mounting arm 32 shown in FIG. 1 extending from the headliner of the vehicle to pivotally secure visor assembly 10 to the headliner 14. Receiving portion 30 may be integrally formed into the inner surface 26 of one of the space apart first and second walls 18, 20 or may comprise a bracket or other receiving device that is secured to the visor housing 16. Visor assembly 10 pivots about the mounting arm 32, allowing an occupant of the vehicle to position visor assembly 10 adjacent a door window or the windshield of a vehicle to limit glare or light entering through the window or windshield.

An aperture 34 may be formed in at least one of the spaced apart walls 18, 20 opposite receiving portion 30. As best shown in FIG. 1, a bar 36 extends generally parallel to the top edge 38 of visor housing 16 within aperture 34 is received in a clamp or fastener on the headliner (not shown) to retain visor assembly 10 in a stored position.

Figure 5:
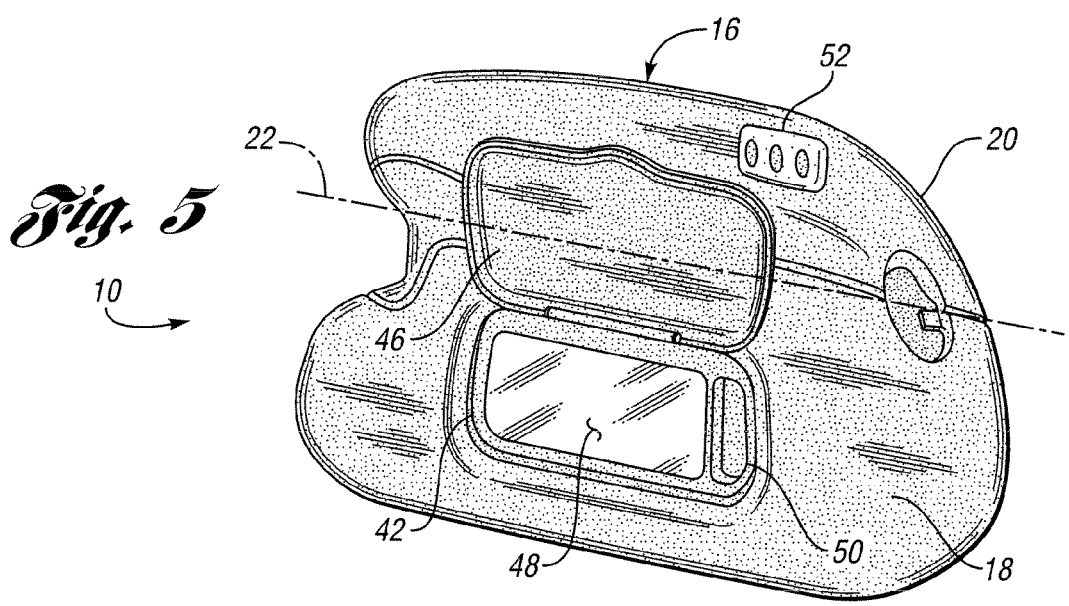
FIG. 5 is a perspective view of an alternative configuration of the outer or appearance surfaces of the visor assembly.

A cover material 40, such as a polymeric coverstock fabric or the like, is placed about the outer surface of the spaced apart first and second walls 18, 20 of the visor housing 16. For purposes of simplicity, cover material is shown in FIGS. 2 and 5. The cover material may additionally extends through into the inner surface 26 of visor housing 16 for attachment purposes. The use of cover material provides an aesthetically pleasing outer appearance.

Figure 4:
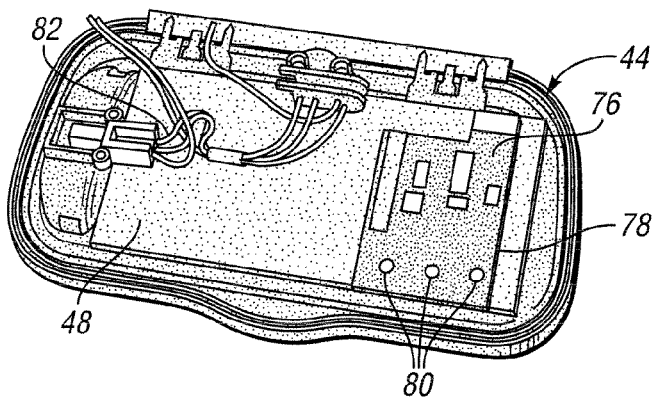
FIG. 4 is a perspective view of the inner surface of the vanity mirror or bezel assembled in the visor assembly.

Referring now to FIGS. 2-4, a channel 42 is formed through the first wall 18 of visor housing 16 and is configured to receive bezel 44. It is understood that the channel 42 may be formed through either of the spaced apart walls to meet design configurations of the passenger compartment. Door 46 is adjustably mounted to the visor housing 16 adjacent the channel 42 and is configured to at least partially cover the channel 42 from the outer surface. As illustrated in FIGS. 2 and 5, door 46 is pivotally mounted to an outer surface 24 of the first spaced apart wall 18 and is adjustable between at least one use position and a stored position at least partially covering the channel 42. It is understood that the door may be mounted in a variety of fashions to the visor housing to accomplish the same objective.

Bezel 44 is configured for positioning on the inner surface 26 of the first wall 18 adjacent channel 42. In one aspect of the present invention, bezel 44 is integrally formed as a cavity into the inner surface or substrate 26 of first wall 18. In another aspect of the present invention, bezel is formed separately from the visor housing 16 and is secured to the inner surface 26 of the first wall 18 for use in the visor assembly 10. A reflective surface 48 is received by the bezel and positioned adjacent the channel 42. One or more lighting features 50 may be provided adjacent the reflective surface 48 to illuminate the area surrounding the reflective surface 48.

One or more openings 54 are formed in the opposing spaced apart second wall 20. Openings 54 are configured to allow buttons 56 of at least one electronic control module 60 to extend therethrough. As will be described in greater detail below, openings 54 are formed in the second wall 20 to align with a corresponding mounting surface 58 provided on the opposing first wall 18 to receive components of the electronic control module 60. Openings 54 are also sized to cooperate with a cover plate 52 as will be described in greater detail below. It is understood that the openings and channels formed in the respective first and second walls may also be formed such that the channel is formed in the second wall and the one or more openings in the first wall. For purposes of this application, the first and second walls of the visor housing are interchangeable.

Figure 7:
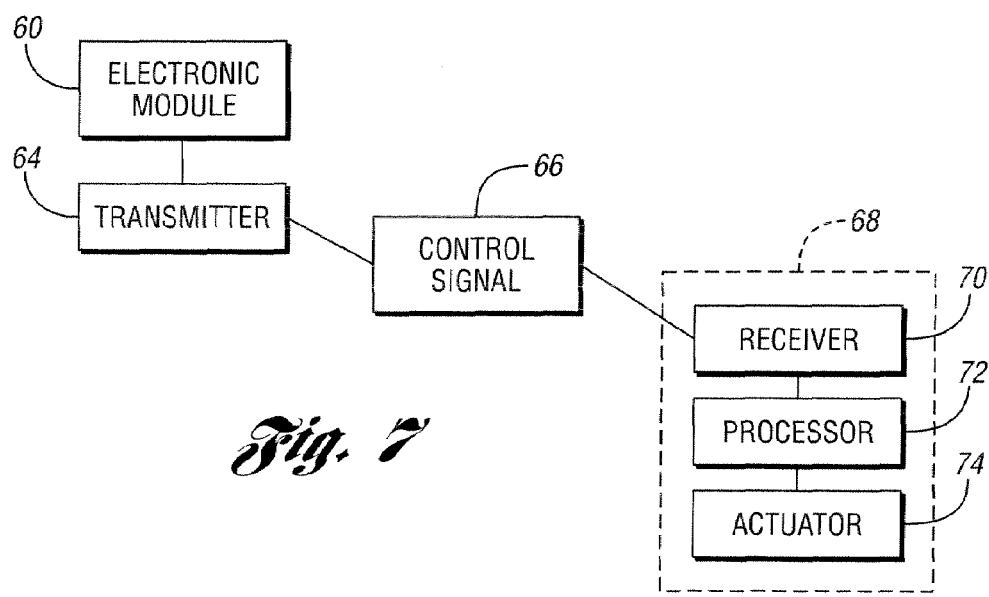
FIG. 7 is a block diagram illustrating operation of the electronic control module with a remote device.

Referring to FIG. 7, an exemplary block diagram of a system incorporating control of one or more features using the electronic control module 60 of the visor assembly is described in greater detail. In this exemplary system, electronic control module 60 includes a transmitter 64 configured for operation by one or more buttons. When a user depresses a button, transmitter 64 transmits a control signal 66 to operate a device 68. The control signal may be transmitted wirelessly or wired to the device. In the case of a wireless control signal, a remote device 68, such a garage door opening system, includes a receiver 70 that receives the control signal 66. Receiver 70 communicates control signal 66 to a processor 72, which in turn instructs an actuator 74 to open or close the garage door. It is understood that electronic control module 60 may, in addition to the active transmission of a control signal in response to actuation of a button, also be configured for passive control, wherein the transmitter at least periodically automatically transmits a control signal.

Referring back to FIGS. 1-6, the electronic control module 60 is shown in more detail. As used herein, the terms "upper" and "lower" describe a component's orientation in relation to the electronic control module 60 in its installed position as depicted in FIG. 1. Electronic control module 60 includes a housing that may be fully received within the visor housing 16 or, as shown in FIGS. 1, 2 and 5, at least partially concealed by a cover plate 52. The cover plate 52 may include one or more openings corresponding with the one or more openings 54 in the wall 20 through which buttons 56 of the electronic control module 60 may at least partially extend.

Electronic control module 60 includes a controller 76 for receiving input and/or transmitting one or more signals to control a remote device. Controller 76 may include a variety of configurations to accomplish the stated purpose. In one exemplary aspect, controller includes a microprocessor 76 disposed on a printed circuit board 78 having one or more switches 80 that are positioned in operative communication with one of the one or more buttons 56 when the spaced apart walls 18, 20 are mated.

In this exemplary aspect, three buttons 56 align with three switches on the circuit board 78. Each switch 80 incorporates an actuating posts (not shown). Upon touching a button, the actuating post in switch engages a contact in the circuit board 78 when the switch is engaged by one of the buttons 56. When the controller detects that the switch 80 is closed, controller instructs the transmitter to send a control signal to the remote device.

One or more buttons 56 may be a membrane mounted in the cover plate 52 that independently engage the one or more switches 80. Alternatively, the button and switch may be formed as an integral unit. There are numerous contemplated attachment methods for connecting the switches and/or buttons to the circuit board, including using an adhesive, vibration welding, sonic welding, screws, and mechanical snaps or with one or more retaining features.

The one or more buttons 56 of electronic control module 60 when assembled as shown in FIG. 1 may be at least partially disposed above the one or more openings 54 in wall 20. The buttons 56 may have a contoured upper surface and a lower surface. The one or more buttons 56 may include tactile or acoustic features or illumination to allow a user to either locate the buttons or to indicate that the desired feature of the electronic control module has been activated.

Referring now to FIGS. 3 and 4, a description of one mounting arrangement for securing the electronic control module 60 to the visor assembly 10 is provided. Circuit board 78 of the electronic control module 60 is received within bezel 44. Circuit board 78 may be received and secured to the bezel or receiving surface by a chemical attachment and/or with one or more mechanical attachment.

In one non-limiting aspect of the invention, the circuit board may be secured to the bezel or rear surface of the reflective surface using a chemical attachment process, such as an adhesive, a liquid, tape or one more pads containing a pressure sensitive adhesive (PSA). Alternatively, in another non-limiting aspect of the invention, the circuit board is secured to the bezel by a mechanical attachment process, such as a molded in feature such as one or more projections or other type of mechanical fastener. Bezel 44 is formed to ensure that when circuit board 78 is mounted therein, the switches 80 on circuit board 78 are properly aligned with the one or more openings 54 on the opposing wall 20.

Figure 6:
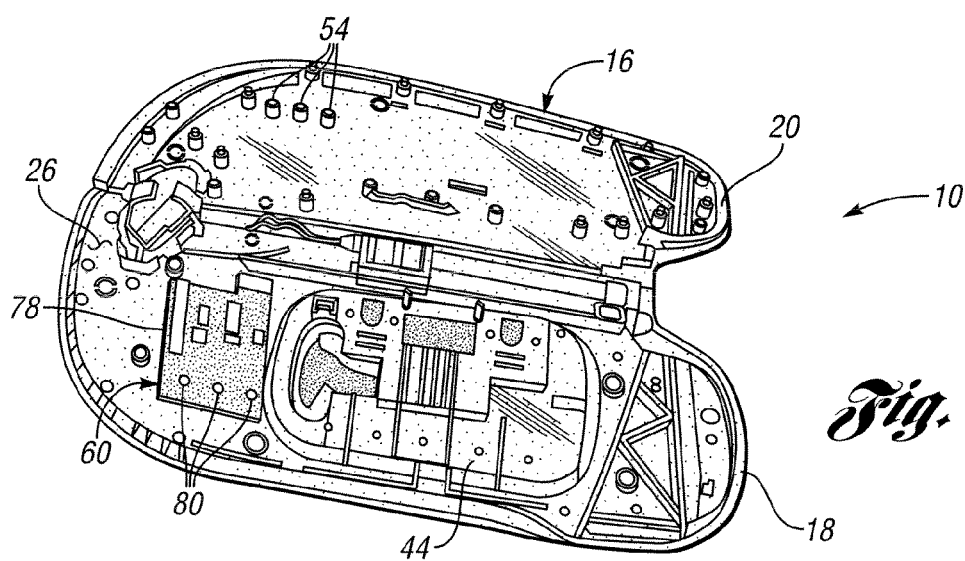
FIG. 6 is a perspective view of an alternative configuration of the inner surfaces or substrates of the visor assembly.

Referring now to FIG. 6, a description of another mounting arrangement for securing the electronic control module 60 to the visor assembly 10 is provided. Circuit board 78 of the electronic control module 60 is received on the inner surface 26 of wall 18. Circuit board 78 may be received and secured within one or more formed projections on the substrate of the wall 18. Alternatively, circuit board may be secured to the substrate using one more pads containing a pressure sensitive adhesive (PSA). The receiving portion of the inner surface of the wall 18 is formed to ensure that when circuit board 78 is mounted therein, the switches 80 on circuit board 78 are properly aligned with the one or more openings 54 on the opposing wall 20.

Referring now to FIG. 4, visor assembly 10 is in electrical communication with the vehicle through wires 82. Wires 82 may provide power for devices in the visor assembly, such as the one or more lighting features and/or the electronic control module. It is also understood that the electronic control module may be powered by an alternative power source, such as a battery or solar cell. Wires 82 may also interconnect the electronic control module to one or more components of the vehicle, allowing a user to control these components with the electronic control module.

In order to operate a remote device, such as opening or closing the garage door, a user activates the electronic control module. In this application, upon activation of a transmitter in the module 60, the transmitter transmits a wireless signal, such as a radio frequency (RF) signal, to the receiver. In response, the controller activates the garage door actuator to open or close the garage door. For security purposes, the receiver may be manually set to recognize the transmitter, such as through switch settings, or the receiver may be pre-set to recognize an identification signal from a particular transmitter. To further improve security, the wireless signal from the transmitter is also typically encrypted. The visor assembly and an electronic control module described herein provides a solution with fewer individual components and allows various features to be provided on at least one unitary part to establish reliable feature orientation and alignment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A visor assembly configured for use in a passenger compartment of a vehicle, the assembly comprising:
   a visor housing having first and second walls each defining an outer surface, an inner surface and a cavity defined therebetween;
   a bezel provided on an inner surface of the first wall; and
   an electronic control module disposed in the visor housing, the module including a transmitter for transmitting a wireless control signal to control one or more remote devices,
   wherein the module further includes one or more buttons extending at least partially through the second wall in the visor housing that are configured to transmit the signal when actuated.

2. The assembly of claim 1 wherein the visor housing further comprises a channel formed through the first wall of the visor and cooperating with the bezel provided on the inner surface of the first wall.

3. The assembly of claim 1 wherein the bezel is integrally formed on the inner surface of the first wall.

4. The assembly of claim 1 wherein the bezel is secured to the inner surface of the first wall.

5. The assembly of claim 1 wherein a reflective surface is received by the bezel and positioned adjacent the channel.

6. The assembly of claim 1 wherein one or more openings are formed in the second wall to receive the one or more buttons of the at least one electronic control module.

7. The assembly of claim 6 further comprising a cover plate disposed on the outer surface of the second wall cooperating with the one or more openings.

8. The assembly of claim 1 wherein the electronic control module further comprises a printed circuit board including one or more switches positioned in operative communication with one of the one or more buttons.

9. The assembly of claim 8 wherein the circuit board of the electronic control module is secured to the inner surface of the first wall.

10. The assembly of claim 8 wherein the circuit board of the electronic control module is secured to the bezel.

11. The assembly of claim 8 wherein the circuit board of the electronic control module is secured to a rear portion of a reflective surface disposed in the bezel.

12. A visor assembly configured for use in a passenger compartment of a vehicle, the assembly comprising:
   a first wall defining an inner surface and an outer surface including a channel formed therein;
   a bezel provided on the inner surface of the first wall cooperating with the channel;
   a second wall cooperating with the first wall to form a visor housing having a cavity defined therein, the second wall including an outer surface, an inner surface and one or more openings formed therethrough;
   an electronic control module disposed in the visor housing having a printed circuit board including one or more switches positioned in operative communication with one or more buttons extending at least partially through the second wall in the visor housing,
   wherein the module includes a transmitter for transmitting a wireless control signal to control one or more remote devices when the one or more buttons are actuated.

13. The assembly of claim 12 wherein the bezel is integrally formed on the inner surface of the first wall.

14. The assembly of claim 12 wherein the bezel is secured to the inner surface of the first wall.

15. The assembly of claim 12 further comprising a cover plate disposed on the outer surface of the second wall cooperating with the one or more openings.

16. The assembly of claim 12 wherein the circuit board of the electronic control module is secured to the inner surface of the first wall.

17. The assembly of claim 12 wherein the circuit board of the electronic control module is secured to the bezel.

18. The assembly of claim 12 wherein the circuit board of the electronic control module is secured by mechanical attachment to a rear portion of a reflective surface disposed in the bezel.

19. A visor assembly configured for use in a passenger compartment of a vehicle, the assembly comprising:
   a visor housing having first and second walls each defining an outer surface, an inner surface and a cavity defined therebetween;
   a bezel provided on an inner surface of one of the first and second walls adjacent channel formed in the wall;
   one or more openings formed in one of the first and second walls opposite the bezel; and
   an electronic control module disposed in the visor housing, the module including a transmitter for transmitting a wireless control signal to control one or more remote devices
   wherein the module further includes one or more buttons extending at least partially through the opening in one of the first and second walls in the visor housing that are configured to transmit the signal when actuated.

20. The assembly of claim 19 further comprising a cover plate disposed on the outer surface of one of the first and second walls cooperating with the one or more openings.

* * * * *